(12) United States Patent
Ahn et al.

(10) Patent No.: US 9,110,472 B2
(45) Date of Patent: Aug. 18, 2015

(54) MOVING ROBOT AND METHOD TO BUILD MAP FOR THE SAME

(75) Inventors: Sung Hwan Ahn, Anyang-si (KR);
Seung Yong Hyung, Yongin-si (KR);
Kyung Shik Roh, Seongnam-si (KR);
Suk June Yoon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 276 days.

(21) Appl. No.: 13/236,050

(22) Filed: Sep. 19, 2011

(65) Prior Publication Data

US 2012/0089295 A1    Apr. 12, 2012

(30) Foreign Application Priority Data

Oct. 7, 2010    (KR) ........................ 10-2010-0097953

(51) Int. Cl.
G05D 1/02    (2006.01)

(52) U.S. Cl.
CPC ............ G05D 1/0274 (2013.01); G05D 1/0242 (2013.01); *G05D 2201/0217* (2013.01)

(58) Field of Classification Search
CPC .. G05B 19/4083; G05B 19/42; G05B 19/425; G05B 2219/45083; B25J 9/1692; G05D 1/0242; G05D 1/0274; G05D 2201/0217
USPC .............................................. 382/195; 901/3
See application file for complete search history.

(56) References Cited

U.S. PATENT DOCUMENTS

| | | | | |
|---|---|---|---|---|
| 6,909,801 B2* | 6/2005 | Wenzel et al. | ................ | 382/152 |
| 6,922,632 B2* | 7/2005 | Foxlin | ........................... | 701/517 |
| 6,959,104 B2* | 10/2005 | Rajagopal et al. | ............ | 382/107 |
| 7,034,831 B2* | 4/2006 | Wenzel et al. | ................ | 345/442 |
| 8,331,652 B2* | 12/2012 | Yoon et al. | .................... | 382/153 |

OTHER PUBLICATIONS

A computationally efficient EKF-vSLAM, 16th Mediterranean Conference on Control and Automation Congress Centre, Ajaccio, France Jun. 25-27, 2008 Souici A.Krim, Ould Ali A.Elaziz and Raja Chatila.*
3D Pose Estimation and Mapping with Time-of-Flight Cameras S. May1, D. Dröschel1, D. Holz1, C. Wiesenl and S. Fuchs2 May 2008.*
"Towards 3D Point cloud based object maps for household environments"; Radu Bogdan Rusu, Author Vitae,; Robotics and Autonomous Systems vol. 56, Issue 11, Nov. 30, 2008, pp. 927-941; http://www.sciencedirect.com/science/article/pii/S0921889008001140; retrieved on Dec. 2, 2013.*

(Continued)

*Primary Examiner* — James Trammell
*Assistant Examiner* — James E Stroud
(74) *Attorney, Agent, or Firm* — Harness, Dickey & Pierce, P.L.C.

(57) ABSTRACT

A moving robot and a method to build a map for the same, wherein a 3D map for an ambient environment of the moving robot may be built using a Time of Flight (TOF) camera that may acquire 3D distance information in real time. The method acquires 3D distance information of an object present in a path along which the moving robot moves, accumulates the acquired 3D distance information to construct a map of a specific level and stores the map in a database, and then hierarchically matches maps stored in the database to build a 3D map for a set space. This method may quickly and accurately build a 3D map for an ambient environment of the moving robot.

14 Claims, 12 Drawing Sheets

(56) References Cited

OTHER PUBLICATIONS

"A new segmentation method for point cloud data"; H. Woo, E. Kang, Semyung Wang, Kwan H. Lee; International Journal of Machine Tools and Manufacture vol. 42, Issue 2, Jan. 2002, pp. 167-178; http://www.sciencedirect.com/science/article/pii/S0890695501001201#; retrieved on Dec. 2, 2013.*

"Low-discrepancy sequence"; http://en.wikipedia.org/wiki/Low-discrepancy_sequence; retrieved Dec. 16, 2013.*

"Low-Discrepancy Curves and Efficient Coverage of Space"; Subramanian Ramamoorthy, Ram Rajagopal, Qing Ruan, Lothar Wenzel; Workshop on Algorithmic Foundations of Robotics VII (2006); http://www.wafr.org/wafr2006/papers/p42.pdf; retrieved on Dec. 16, 2013.*

"On the Relationship between Classical Grid Search and Probabilistic Roadmaps"; Steven M. LaValle, Stephen R. Lindemann, Michael S. Branicky; The International Journal of Robotics Research; Aug. 2004 vol. 23 No. 7-8, pp. 673-692; http://ijr.sagepub.com/content/23/7-8/673.short; retrieved on Dec. 16, 2013.*

"Incremental Grid Sampling Strategies in Robotics"; Stephen R. Lindemann, Anna Yershova, Steven M. LaValle; Algorithmic Foundations of Robotics VI Springer Tracts in Advanced Robotics vol. 17, 2005, pp. 313-328 http://link.springer.com/chapter/10.1007/10991541_22#; retrieved on Dec. 16, 2013.*

"Incremental low-discrepancy lattice methods for motion planning"; Stephen R. Lindemann, Steven M. LaValle; Robotics and Automation, 2003. Proceedings. ICRA '03. IEEE International Conference on (vol. 3), pp. 2920-2927; http://ieeexplore.ieee.org/xpls/abs_all.jsp?arnumber=1242039&tag=1; retrieved on Dec. 16, 2013.*

"Structured light 2D range finder for simultaneous localization and map-building (SLAM) in home environments"; Myung-Jin Jung, Hyun Myung, Sun-Gi Hong, DongRyeol Park, Hyoung-Ki Lee, SeokWon Bang; Micro-Nanomechatronics and Human Science, 2004; pp. 371-376; http://ieeexplore.ieee.org/xpls/abs_all.jsp?arnumber=1421267; retrieved on Dec. 16, 2013.*

"Differentiable_manifold"; http://en.wikipedia.org/wiki/Differentiable_manifold; retrieved on Dec. 16, 2013.*

"Euclidean_vector"; http://en.wikipedia.org/wiki/Euclidean_vector; retrieved on Dec. 16, 2013.*

"Homeomorphisms"; http://en.wikipedia.org/wiki/Homeomorphisms; retrieved on Dec. 16, 2013.*

"Manifold"; http://en.wikipedia.org/wiki/Manifold; retrieved on Dec. 16, 2013.*

"Map_(mathematics)"; http://en.wikipedia.org/wiki/Map_(mathematics); retrieved on Dec. 16, 2013.*

"Point_(geometry)"; http://en.wikipedia.org/wiki/Point_(geometry); retrieved on Dec. 16, 2013.*

"Raster_graphics"; http://en.wikipedia.org/wiki/Raster_graphics; retrieved on Dec. 16, 2013.*

"Tensor_field"; http://en.wikipedia.org/wiki/Tensor_field; retrieved on Dec. 16, 2013.*

"Texel_(graphics)"; http://en.wikipedia.org/wiki/Texel_(graphics); retrieved on Dec. 16, 2013.*

"Topological_space"; http://en.wikipedia.org/wiki/Topological_space; retrieved on Dec. 16, 2013.*

"Tuple"; http://en.wikipedia.org/wiki/Tuple; retrieved on Dec. 16, 2013.*

"Vector_(mathematics_and_physics)"; http://en.wikipedia.org/wiki/Vector_(mathematics_and_physics); retrieved on Dec. 16, 2013.*

"Voxel"; http://en.wikipedia.org/wiki/Voxel; retrieved on Dec. 16, 2013.*

"Multi-Level Surface Maps for Outdoor Terrain"; Rudolph Triebel, Patrick Pfaff, Wolfram Burgard; International Conference on Intelligent Robots and Systems, Oct. 9-15, 2006; pp. 2276-2282; http://ieeexplore.ieee.org/xpls/abs_all.jsp?arnumber=4058725; retrieved on Dec. 16, 2013.*

"Iterative_closest_point"; http://en.wikipedia.org/wiki/Iterative_closest_point; retrieved on Dec. 16, 2013.*

"Hierarchy"; http://en.wikipedia.org/wiki/Hierarchy; retrieved on Dec. 16, 2013.*

"Binary_tree"; http://en.wikipedia.org/wiki/Binary_tree; retrieved on Dec. 16, 2013.*

"Estimation and Detection with Applications to Navigation"; David Törnqvist; Linköping studies in science and technology. Dissertations. No. 1216; 2008; http://liu.diva-portal.org/smash/get/diva2:117357/FULLTEXT05; retrieved on Dec. 16, 2013.*

"Pedestrian Detection and Tracking Using Three-Dimensional LADAR Data"; Luis E. Navarro-Serment, Christoph Mertz, and Martial Hebert; Int. Conf on Field and Service Robotics (FSR), 2009; http://www.ri.cmu.edu/pub_files/2009/7/navarro_et_al_fsr_09.pdf; retrieved on Dec. 16, 2013.*

"3D Mapping with Semantic Knowledge"; Andreas Nüchter, Oliver Wulf, Kai Lingemann, Joachim Hertzberg, Bernardo Wagner, Hartmut Surmann; RoboCup 2005: Robot Soccer World Cup IX Lecture Notes in Computer Science vol. 4020, 2006, pp. 335-346; http://link.springer.com/chapter/10.1007/11780519_30#; retrieved on Dec. 16, 2013.*

* cited by examiner

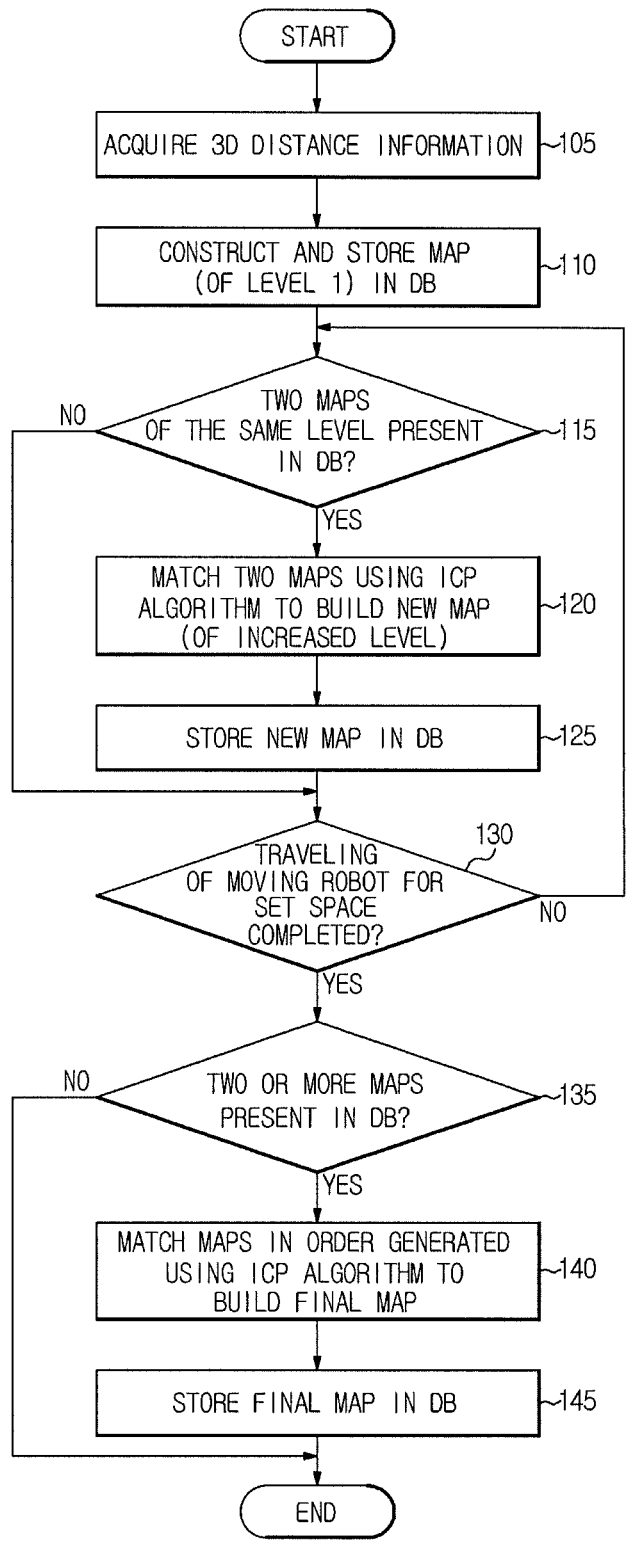

(c)          (d)          (c')

(a'')

FIG. 9
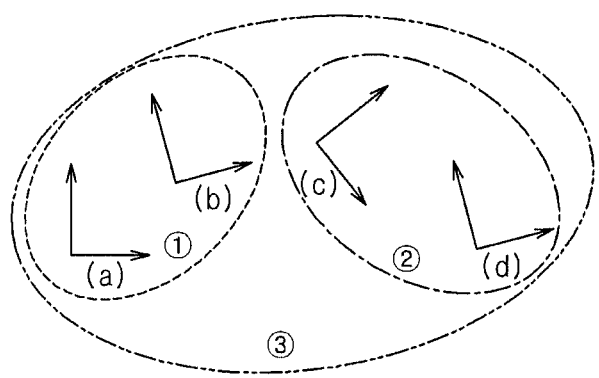
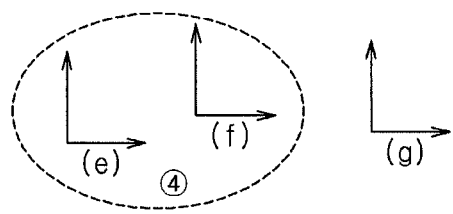

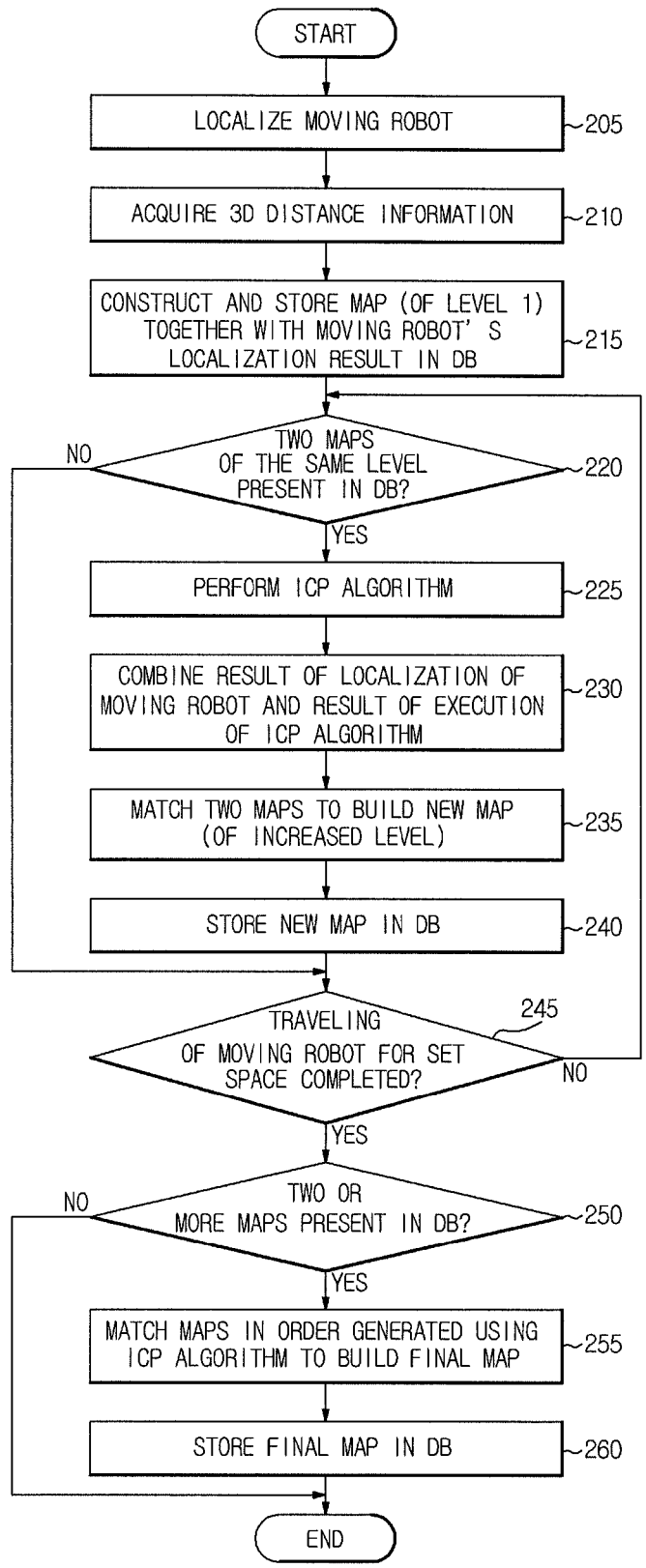

MOVING ROBOT AND METHOD TO BUILD MAP FOR THE SAME

CROSS-REFERENCE TO RELATED APPLICATION(S)

This application claims the benefit of Korean Patent Application No. 2010-0097953, filed on Oct. 7, 2010 in the Korean Intellectual Property Office, the disclosure of which is incorporated herein by reference.

BACKGROUND

1. Field

Embodiments relate to a moving robot and a method to build a map for the same, wherein a 3D map for an ambient environment of the moving robot may be built using a Time of Flight (TOF) camera that may acquire 3D distance information in real time.

2. Description of the Related Art

Moving robots are used in various fields due to the development of sensors and controllers. Typical examples include a household assistant robot, a service robot for public facilities, and a conveyance robot and a worker assistant robot used in production lines. Demand for moving robots and the field of application of moving robots are expected to significantly increase in the future. To locate (or localize) the moving robot and to create information of an ambient environment of the moving robot without prior information about the ambient environment, the moving robot needs to simultaneously perform localization and map building processes in an associated manner. This scheme is referred to as "Simultaneous Localization And Map-building (SLAM)".

To perform map building, the moving robot should acquire information about the ambient environment. The moving robot may use a Time of Flight (TOF) camera to acquire information about the ambient environment. The TOF camera is a device that acquires 3D distance information using a TOF method which measures the time that it takes for infrared light emitted from a light emitting unit to return to a light receiving unit after being reflected from an object. The TOF camera may acquire 3D distance information in real time since it may calculate 3D distance information from an infrared intensity image without complex calculation processes.

Occupancy voxel map building has been used as a method to build a map of an ambient environment of a moving robot using the TOF camera. The occupancy voxel map building method divides the ambient environment of the moving robot into small 3D voxels and fills voxels corresponding to 3D distance information acquired by the TOF camera in accordance with current position information of the moving robot. That is, the possibility of presence of an object in each voxel in a 3D space is probabilistically written to the voxel to build a 3D voxel map. However, according to the occupancy voxel map building method, the accuracy of the built map decreases as the travel distance of the moving robot increases or as the size of a space within which the moving robot moves (i.e., a space to be mapped) increases since the accuracy of information registered in each voxel decreases as errors in location information of the moving robot increase.

An Iterative Closest Point (ICP) algorithm has been suggested to overcome such problems of the occupancy voxel map building method. The ICP algorithm uses a method to minimize the sum of distances between two sampled 3D point cloud data A and B as shown in FIG. 1. The ICP algorithm may calculate a 3D rigid body transformation (a translation or rotation transformation) which minimizes the sum of distances between the two 3D point cloud data A and B. The ICP algorithm may improve the accuracy of the built 3D map compared to the occupancy voxel map building method since the ICP algorithm can relatively correctly match two 3D point cloud data using the calculated 3D rigid body transformation even when the location information of the moving robot is incorrect.

A sequential map building method using a conventional ICP algorithm includes sequential matching processes (①→②→③), each including sequentially accumulating a plurality of 3D point cloud data as the moving robot moves, locating points corresponding to the 3D point cloud data and matching the plurality of 3D point cloud data as shown in FIG. 2. Specifically, the sequential map building method performs map building for an ambient environment of the moving robot by sequentially performing a matching process "①" to match two sequentially accumulated 3D point cloud data (a) and (b) to build a new map, a matching process "②" to match the new map built through the matching process "①" and subsequently accumulated 3D point cloud data (c) to build a new map, and a matching process "③" to match the new map built through the matching process "②" and subsequently accumulated 3D point cloud data (d) to build a new map. That is, the sequential map building method performs the matching processes in the order of ①→②→③.

However, in this sequential map building method, as the travel distance of the moving robot increases or as the size of the space to be modeled increases, a search space within which correlations between two 3D point cloud data are determined increases, thereby increasing calculation time. In addition, the sequential map building method has a relatively high possibility of incorrectly determining correlations between two 3D point cloud data having different size levels which are compared with each other and also has no solution to errors accumulated as the travel distance increases, thereby reducing the accuracy of the built map.

Moreover, since the map building method using the conventional ICP algorithm is a type of optimization technique which finds a rigid body transformation relation which minimizes the sum of distances between two 3D point cloud data, the map building method provides transformation results having significant errors if the solution converges to local minima.

SUMMARY

Therefore, it is an aspect of an embodiment to provide a moving robot and a method to build a map for the same, wherein a 3D map for an ambient environment of the moving robot may be built using a Time of Flight (TOF) camera that may acquire 3D distance information in real time.

Additional aspects of embodiments will be set forth in part in the description which follows and, in part, will be obvious from the description, or may be learned by practice of the embodiments.

In accordance with an aspect of an embodiment, a method to build a map for a moving robot includes acquiring 3D distance information of an object present in a path along which the moving robot moves, accumulating the acquired 3D distance information to construct a map of a specific size level and storing the maps in a database, and hierarchically matching, by a computer, the maps stored in the database to build a 3D map for a set space.

Accumulating the acquired 3D distance information may include accumulating the 3D distance information based on a coordinate system of a movement start point of the moving robot while the moving robot travels a preset distance, or while the moving robot travels over a preset area, or during a preset time when the moving robot travels at a constant speed.

Hierarchically matching the maps to build the 3D map for the set space may include determining whether or not two maps of equal size level are present in the database, matching, upon determining that two maps of equal size level are present in the database, the two maps using an Iterative Closest Point (ICP) algorithm to build a new map of an increased size level, and storing the new map in the database.

The method may further include determining whether or not two or more maps are present in the database upon completion of traveling of the moving robot for the set space, and matching, upon determining that two or more maps are present in the database, said two or more maps using the ICP algorithm in an order in which said two or more maps have been generated to build a final map for the set space.

In accordance with another aspect of an embodiment, a method to build a map for a moving robot includes localizing the moving robot, acquiring 3D distance information of an object present in a path along which the moving robot moves, accumulating the acquired 3D distance information to construct maps of a specific level and storing the map, together with a result of the localization of the moving robot, in a database, determining whether or not two maps of equal size level are present in the database, and upon determining that two maps of equal size level are present in the database, executing, by a computer, an Iterative Closest Point (ICP) algorithm on said two maps, calculating, by a computer, new rigid body transformation information by combining a result of the localization of the moving robot and a result of the execution of the ICP algorithm, and matching, by a computer, said two maps using the calculated new rigid body transformation information to build a new map of an increased level to build a 3D map for a set space.

The method may further include storing the new map in the database.

Localization of the moving robot may be performed using Extended Kalman Filter (EKF)-based Simultaneous Localization And Map-building (SLAM).

Accumulating the acquired 3D distance information may include accumulating the 3D distance information based on a coordinate system of a movement start point of the moving robot while the moving robot travels a preset distance, or while the moving robot travels over a preset area, or during a preset time when the moving robot travels at a constant speed.

The method may further include determining whether or not two or more maps are present in the database upon completion of traveling of the moving robot for the set space, and matching, upon determining that two or more maps are present in the database, said two or more maps using the ICP algorithm in an order in which said two or more maps have been generated to build a final map for the set space.

In accordance with another aspect of an embodiment, a moving robot includes a 3D distance information acquirer to acquire 3D distance information of an object present in a path along which the moving robot moves, and a controller to accumulate the acquired 3D distance information to construct maps of a specific level and to store the maps in a database and then to hierarchically match the maps stored in the database to build a 3D map for a set space.

The 3D distance information acquirer may be a Time of Flight (TOF) camera.

The controller may accumulate the 3D distance information based on a coordinate system of a movement start point of the moving robot while the moving robot travels a preset distance, or while the moving robot travels over a preset area, or during a preset time when the moving robot travels at a constant speed.

The controller may determine whether or not two maps of equal size level are present in the database, match, upon determining that two maps of equal size level are present in the database, the two maps using an Iterative Closest Point (ICP) algorithm to build a new map of an increased level, and store the new map in the database.

The controller may determine whether or not two or more maps are present in the database upon completion of traveling of the moving robot for the set space, and match, upon determining that two or more maps are present in the database, the two or more maps using the ICP algorithm in an order in which the two or more maps have been generated to build a final map for the set space.

BRIEF DESCRIPTION OF THE DRAWINGS

These and/or other aspects of embodiments will become apparent and more readily appreciated from the following description of embodiments, taken in conjunction with the accompanying drawings of which:

FIG. 7 is a flow chart illustrating a method to build a map for a moving robot according to an embodiment;

FIG. 9 illustrates a procedure in which a method to build a map for a moving robot according to an embodiment is applied when 3D point cloud data of level 1 is acquired a total of seven times while the moving robot travels; and FIG. 10 is a flow chart illustrating a method to build a map for a moving robot according to another embodiment.

DETAILED DESCRIPTION

Figure 1:
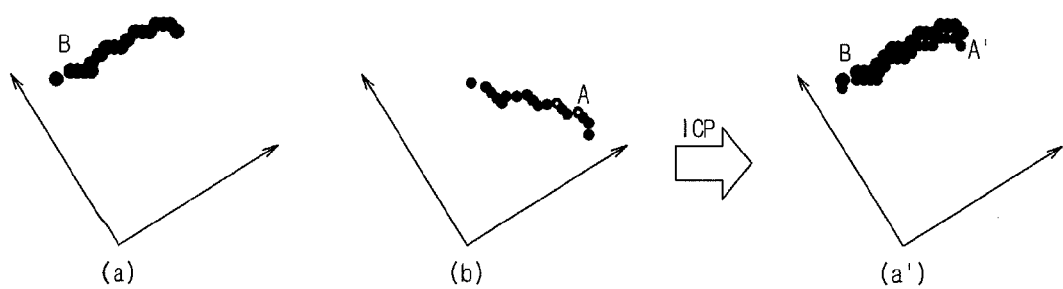
FIG. 1 illustrates the concept of an ICP algorithm.
Figure 2:
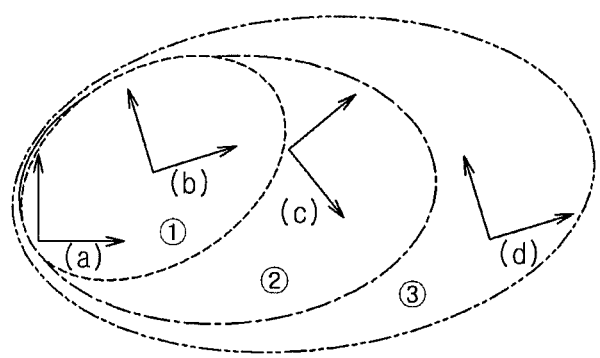
FIG. 2 is a conceptual diagram illustrating a sequential map building method using a conventional ICP algorithm.

Reference will now be made in detail to embodiments, examples of which are illustrated in the accompanying drawings, wherein like reference numerals refer to like elements throughout.

Figure 3:
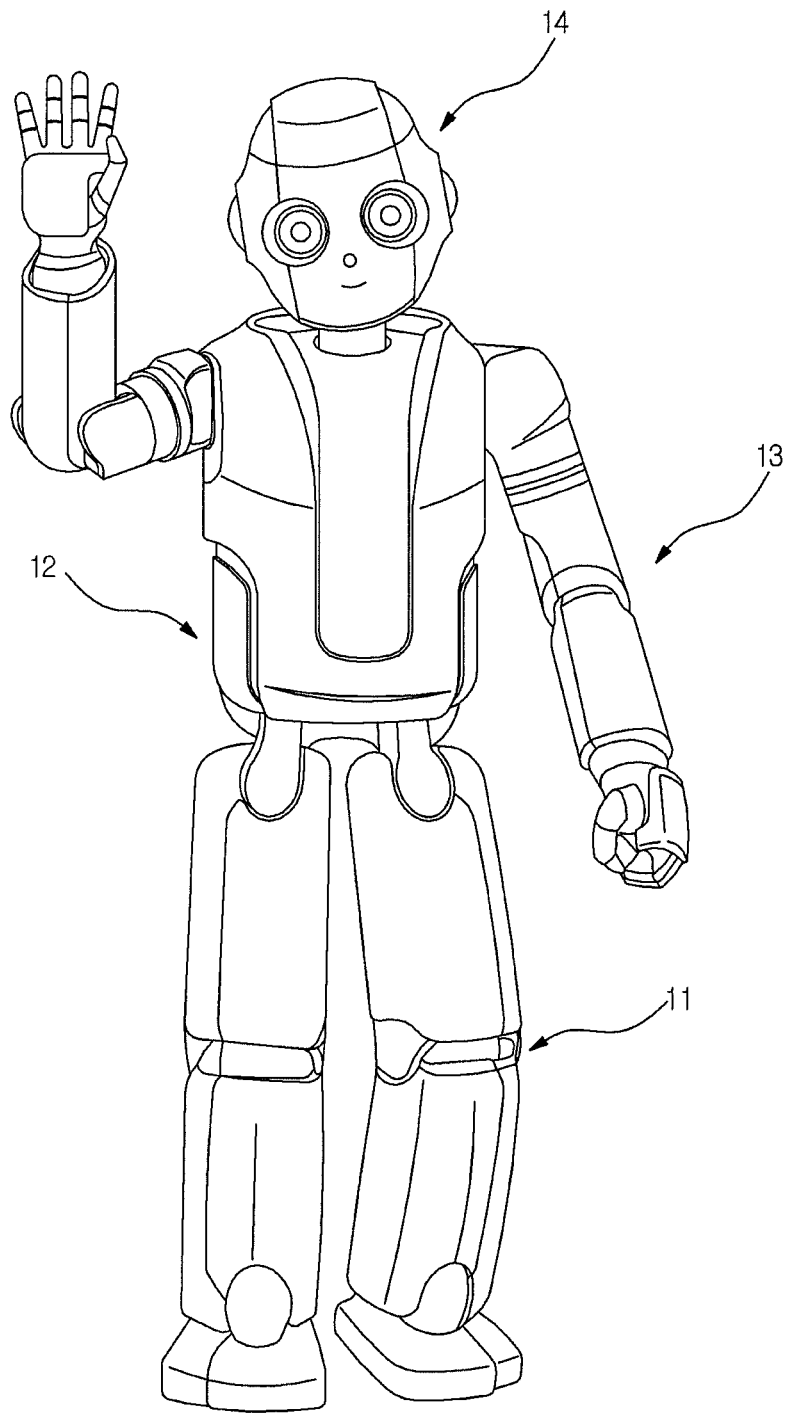
FIG. 3 illustrates an exterior of a moving robot according to an embodiment.

FIG. 3 illustrates an exterior of a moving robot according to an embodiment.

As shown in FIG. 3, the moving robot 10 according to an embodiment is a bipedal robot which includes two legs 11, an upper body 12, two arms 13, and a head 14 and automatically walks using the two legs 11, similar to humans.

Although embodiments are described with reference to a bipedal robot as an example, the embodiments may be applied to various other types of moving robots such as a household cleaning robot, a service robot for public facilities, and a conveyance robot and a worker assistant robot used in production lines.

Figure 4:
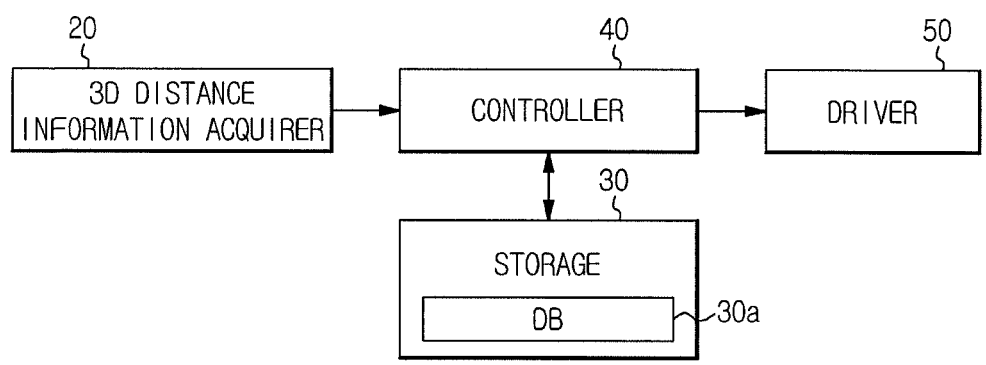
FIG. 4 is a control block diagram of a moving robot according to an embodiment.

FIG. 4 is a control block diagram of a moving robot according to an embodiment.

As shown in FIG. 4, the moving robot 10 according to an embodiment includes a 3D distance information acquirer 20, a storage unit 30, a controller 40, and a driver 50 in addition to the components shown in FIG. 3.

The 3D distance information acquirer 20 is 3D measurement equipment that acquires 3D distance information of obstacles (or objects) present in a travel path from 3D images that are obtained at regular intervals while traveling in an ambient environment in which the obstacles (or objects) are present. Due to development of technologies for the 3D measurement equipment, the 3D distance information acquirer 20 may easily obtain 3D distance information of various objects located in a path along which the moving robot 10 travels. A Time of Flight (TOF) camera may be used as the 3D distance information acquirer 20. Of course, any other device such as a laser distance sensor or an ultrasonic sensor may be used as the 3D distance information acquirer 20, provided that the device may acquire 3D distance information of objects located in a path along which the moving robot 10 travels.

The TOF camera acquires 3D distance information using a Time of Flight method which measures the time required for an infrared beam emitted from a light emitting unit to return to a light receiving unit after being reflected from an object. The TOF camera may acquire 3D distance information in real time since the TOF camera may calculate 3D distance information from an infrared intensity image without additional complex calculation processes.

The storage unit 30 is a memory to store a database 30a. The database 30a stores a binary tree representing a matching structure of maps (3D point cloud data) built through accumulation of 3D distance information acquired through the 3D distance information acquirer 20. 3D point cloud data constituting each map, the size level of each map, and results of localization of the moving robot 10 calculated through the controller 40 are stored in the database 30a.

The controller 40 accumulates 3D distance information acquired from the 3D distance information acquirer 20 to construct a map of a specific size level (for example, level 1), stores the map in the database 30a of the storage unit 30, and hierarchically matches maps stored in the database to build a 3D map for a set space (i.e., a space to be mapped). Here, in the hierarchical matching method, a matching process is performed only when two sequential maps having the same size level are present in the database 30a. This matching process is iteratively performed until two maps (i.e., 3D point cloud data) having the same size level are not present in the database 30a. The matching process is iteratively performed to match maps stored in the database 30a to construct a map of a higher size level while sequentially increasing the size level of the constructed map to build a map for the set space.

The controller 40 constructs a map of a specific size level (for example, level 1) by accumulating 3D distance information input from the 3D distance information acquirer 20 based on the coordinate system of a movement start point, at which the moving robot 10 has started moving, while the moving robot 10 travels a preset distance, or while the moving robot 10 travels over a preset area, or during a preset time in the case where the moving robot 10 travels at a constant speed. The controller 40 then stores the constructed map in the database 30a.

The controller 40 calculates new rigid body transformation information by combining the result of execution of the ICP algorithm during the procedure, in which maps (3D point cloud data) are matched according to the hierarchical matching method, with the result of localization (or location) of the moving robot 10 and matches maps stored in the database 30a using the calculated new rigid body transformation information to build a 3D map for the set space. Here, localization of the moving robot 10 is performed using an Extended Kalman Filter (EKF)-based Simultaneous Localization And Map-building (SLAM) technique.

The controller 40 includes an internal memory (not shown). The internal memory (not shown) of the controller 40 stores a preset distance, a preset area, a preset time, or the like corresponding to a reference range over which 3D distance information input from the 3D distance information acquirer 20 is accumulated to construct a map (3D point cloud data) of level 1. The controller 40 may include a timer (not shown) to measure a travel time of the moving robot 10 to determine whether or not the moving robot has moved over the reference range in which 3D distance information input from the 3D distance information acquirer 20 is accumulated to construct a map (3D point cloud data) of level 1.

The driver 50 drives (i.e., "controls") the moving robot 10 based on the 3D map information created by the controller 40 to allow the moving robot 10 to move by itself along a travel path without collision with obstacles. A hierarchical map building method using an ICP algorithm that is applied to embodiments is described below with reference to FIGS. 5 and 6.

Figure 5:
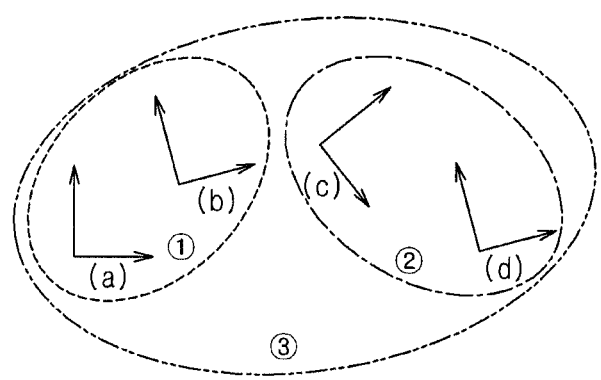
FIG. 5 illustrates a hierarchical map building method using an ICP algorithm that is applied to embodiments.
Figure 6:
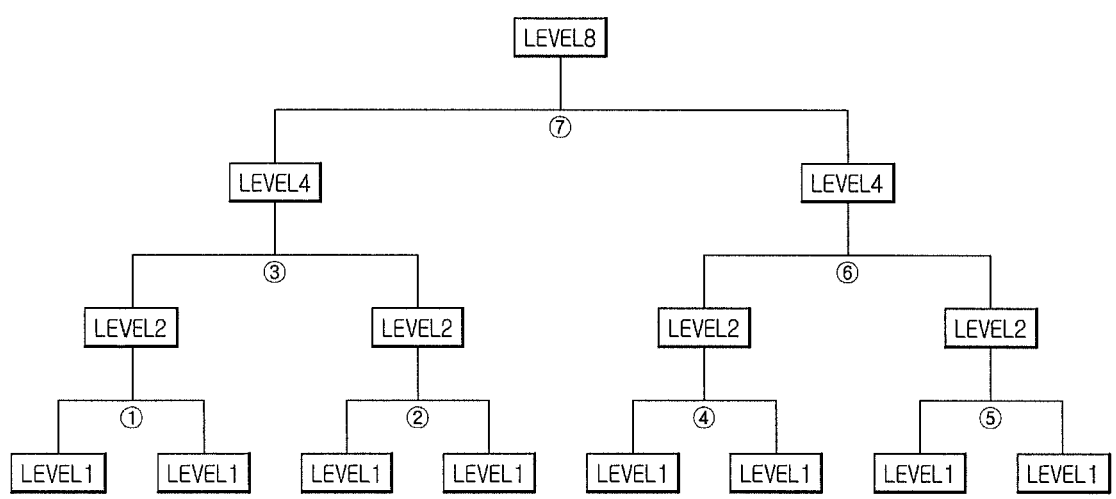
FIG. 6 illustrates an exemplary binary tree representing a matching structure of a plurality of acquired 3D point cloud data in a hierarchical map building method using an ICP algorithm that is applied to embodiments.

In the hierarchical map building method using the ICP algorithm that is applied to embodiments, an ICP matching process is performed only for two sequential maps (3D point cloud data) having the same size level, unlike a sequential map building method using a conventional ICP algorithm. Specifically, ICP matching processes are performed to build maps of the ambient environment of the moving robot 10 in the order ①→②→③ as shown in FIG. 5 such that, first, two maps (a) and (b) having the same size level (for example, level 1) are matched to build a new map of level 2 (matching process ①) and then two maps (c) and (d) of level 1 acquired thereafter are matched to build a new map of level 2 (matching process ②) and then the two new built maps of level 2 are matched to build a new map of level 4 (matching process ③). Structures of maps (3D point cloud data) constructed by accumulating 3D distance information and structures of maps acquired through ICP matching processes are stored in a binary tree format in the database 30a of the storage unit 30. For example, in the case where 3D point cloud data of level 1 has been acquired 8 times, maps are stored in binary tree format in the database 30a as shown in FIG. 6. Here, matching processes between maps are performed in the order of ①→②→③→④→⑤→⑥→⑦.

As described above, in the hierarchical map building method using the ICP algorithm applied to embodiments, a matching process is performed only when two sequential maps having the same size level are present in the database 30a. This matching process is iteratively performed until two maps (i.e., 3D point cloud data) having the same size level are not present in the database 30a. The matching process is iteratively performed to match maps stored in the database 30a to construct a map of a higher size level while sequentially increasing the size level of the constructed map to build a map for the set space.

In the hierarchical map building method using the ICP algorithm applied to embodiments, it may be possible to extend the size of the map by constructing a map of high size level through combination of maps of low size level. To accomplish this, if a size level of newly input 3D point cloud data is lower than a size level of a previously constructed map, the newly input 3D point cloud data is combined with next newly input 3D point cloud data and the combined data is stored in the database 30a and a corresponding matching process is delayed until the size level of the data is increased to the size level of the previously constructed map.

Such a binary-tree-based data processing method may reduce the processing time (calculation time) required to find correlations between a plurality of 3D point cloud data, compared to the sequential data processing method. In addition, since the binary-tree-based data processing method finds a transformation relation between two 3D point cloud data having the same size level, the method may also reduce the possibility of finding incorrect correlations, thereby reducing matching errors when a map is built.

An ICP algorithm used to match two 3D point cloud data in embodiments uses an optimization scheme which performs processes to correlate the nearest points of two 3D point cloud data (represented by "p" and "q") acquired through the 3D distance information acquirer 20 one-to-one with each other and to find a rigid body transformation, which minimizes the sum of the distances between the nearest points of the two 3D point cloud data p and q, and repeats the same processes after applying the rigid body transformation to the 3D point cloud data q. Here, the sum G(R,t) of the distances between 3D point cloud data q and the 3D point cloud data p calculated through the rigid body transformation, which is expressed by Equation 1, is used as a reference (criterion) for the optimization procedure. Finally, a rigid body transformation relation (Equation 2) which minimizes the distance sum G(R,t) expressed in Equation 1 is used to perform matching.

$$G(R, t) = \sum_i \|Rp_i + t - q_i\| \qquad \text{[Equation 1]}$$

$$(R', t') = \underset{R \in R_{3 \times 3}, t \in T_{3 \times 1}}{\operatorname{argmin}} G(R, t), \qquad \text{[Equation 2]}$$

where "R" is a rotation transformation matrix calculated by executing the ICP algorithm and "t" is a translation transformation matrix calculated by executing the ICP algorithm.

The rotation transformation matrix "R" and the translation transformation matrix "t" found to minimize the sum G(R,t) of the distances between the two 3D point cloud data p and q are used to match the two 3D point cloud data to construct a map.

A method to build a map for a moving robot according to an embodiment is described below with reference to FIG. 7.

Before description of this embodiment, first, it is assumed that a preset distance, a preset area, a preset time, or the like corresponding to a reference range, over which 3D distance information input from the 3D distance information acquirer 20 is accumulated to construct a map (3D point cloud data) of level 1, is stored in the internal memory (not shown) of the controller 40. It is also assumed that the controller 40 includes a timer (not shown) to measure a travel time of the moving robot 10 to determine whether or not the moving robot has moved over the reference range in which 3D distance information input from the 3D distance information acquirer 20 is accumulated to construct a map (3D point cloud data) of level 1.

When the moving robot 10 starts traveling, the controller 40 receives 3D distance information from the 3D distance information acquirer 20 (105). Thereafter, the controller 40 constructs a map (3D point cloud data) of level 1 by accumulating 3D distance information input from the 3D distance information acquirer 20 based on the coordinate system of the movement start point of the moving robot 10 while the moving robot 10 travels a preset distance (①), or while the moving robot 10 travels over a preset area in the set space (②), or during a preset time in the case where the moving robot 10 travels at a constant speed (③). The controller 40 then stores the constructed map in the database 30a (110). Here, the movement start point indicates the location of the moving robot 10 when the moving robot 10 starts moving over the reference range (such as a preset distance) to construct a map (3D point cloud data) of level 1. 3D point cloud data required to construct a map and the size level of the map are stored together in the database 30a.

The controller 40 then determines whether or not two maps of the same size level are present in the database 30a of the storage unit 30 (115).

Upon determining that two maps of the same size level are not present in the database 30a of the storage unit 30 ("NO" in operation 115), specifically, upon determining that only one map of the same level size is present in the database 30a, the controller 40 proceeds to operation 130 to determine whether or not the moving robot 10 has completed traveling of the set space (i.e., the space to be mapped).

On the other hand, upon determining that two maps of the same size level are present in the database 30a of the storage unit 30 ("YES" in operation 115), the controller 40 matches the two maps having the same size level to build a new map of an increased size level using the ICP algorithm (120) and stores the new map in the database 30a (125).

The controller 40 then determines whether or not the moving robot 10 has completed traveling of the set space (130). Here, the user may determine whether or not the moving robot 10 has completed traveling of the set space and provide the determination result to the controller 40 through an input unit (not shown) and the moving robot 10 itself may also determine whether or not the moving robot 10 has completed traveling of the set space.

Upon determining that the moving robot 10 has not completed traveling of the set space ("NO" in operation 130), the controller 40 returns to operation 115 to continue to receive 3D distance information of the set space from the 3D distance information acquirer 20 until two maps of the same level are present in the database 30a and to construct a map of level 1 and then to store the map in the database 30a.

On the other hand, upon determining that the moving robot 10 has completed traveling of the set space ("YES" in operation 130), the controller 40 determines whether or not two or more maps are present in the database 30a of the storage unit 30 (135).

Upon determining that two or more maps are not present in the database 30a ("NO" in operation 135), specifically, upon determining that only one map is present in the database 30a, the controller 40 determines that map building for the set space through the hierarchical map building method has been completed and that only one final map is present in the database 30a and then terminates the map building procedure.

Upon determining that two or more maps are present in the database 30a ("YES" in operation 135), map building for the set space through the hierarchical map building method has not been completed and builds a final map for the set space by sequentially matching the maps in the order, in which the maps are generated, using the ICP algorithm (140). Specifically, the controller 40 sequentially matches maps stored in the database 30a in the order in which the maps are generated through the sequential map building method to build a final map for the set space.

The controller 40 then stores the final map for the set space in the database 30a of the storage unit 30 (145) and then terminates the map building procedure.

Figure 8A:
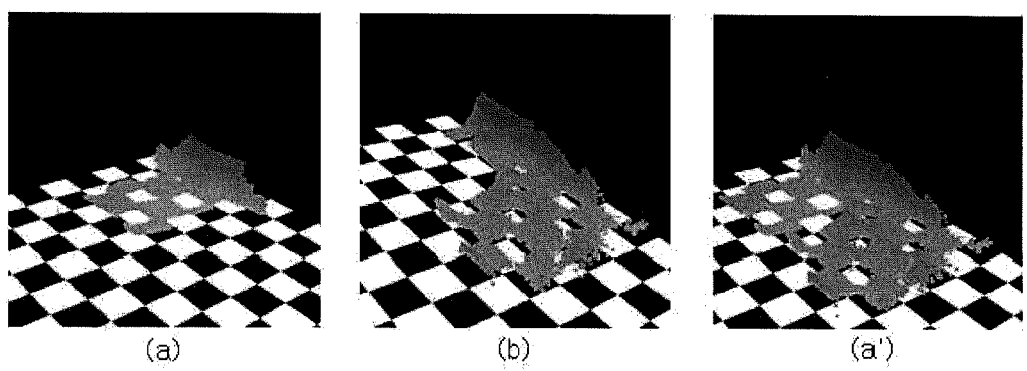
FIGS. 8A to 8C illustrate a procedure in which a method to build a map for a moving robot according to an embodiment is applied when 3D point cloud data of level 1 is acquired a total of four times while the moving robot travels.
Figure 8B:
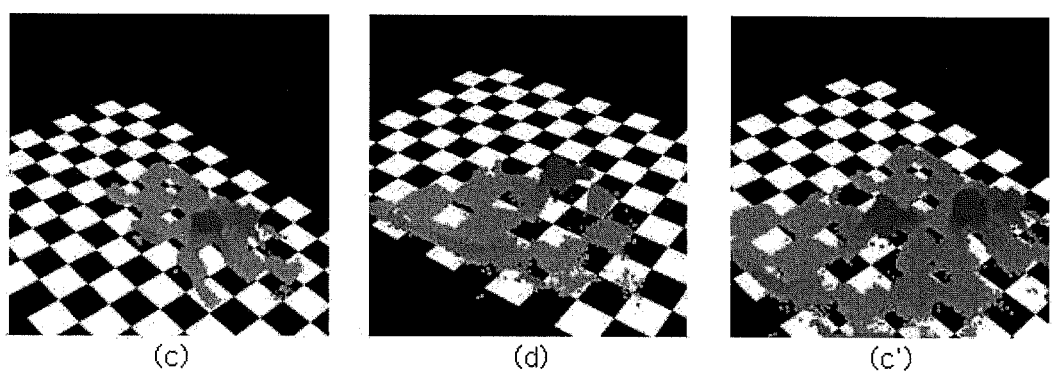
Figure 8C:
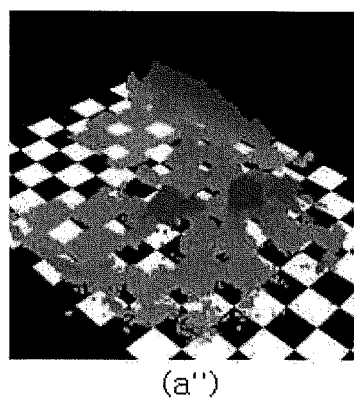

FIGS. 8A to 8C illustrate a procedure in which a method to build a map for a moving robot according to an embodiment applied when 3D point cloud data of level 1 is acquired a total of four times while the moving robot travels.

As shown in FIGS. 8A to 8C, the controller 40 accumulates 3D distance information input from the 3D distance information acquirer 20 to construct a map of level 1 (see "(a)" in FIG. 8A) and stores the map in the database 30a of the storage unit 30. Then, the controller 40 continues to accumulate 3D distance information input from the 3D distance information acquirer 20 to construct a map of level 1 (see "(b)" in FIG. 8A) and stores the map in the database 30a of the storage unit 30.

Here, since two maps of level 1 are present in the database 30a of the storage unit 30, the controller 40 obtains a rigid body transformation relation between the two maps "(a)" and "(b)" in FIG. 8A using the ICP algorithm and matches the two maps to build a new map of increased level 2 (see "(a')" in FIG. 8A) and then stores the new map in the database 30a of the storage unit 30.

Then, the controller 40 accumulates 3D distance information input from the 3D distance information acquirer 20 to construct a map of level 1 (see "(c)" in FIG. 8B) and stores the map in the database 30a of the storage unit 30. Then, the controller 40 continues to accumulate 3D distance information input from the 3D distance information acquirer 20 to construct a map of level 1 (see "(d)" in FIG. 8B) and stores the map in the database 30a of the storage unit 30.

Here, since two maps of level 1 are present in the database 30a of the storage unit 30, the controller 40 obtains a rigid body transformation relation between the two maps "(c)" and "(d)" in FIG. 8B using the ICP algorithm and matches the two maps to build a new map of increased level 2 (see "(c')" in FIG. 8B) and then stores the new map in the database 30a of the storage unit 30.

After matching of the maps (a) and (b) of level 1 and matching of the maps (c) and (d) of level 1, two maps of level 2, i.e., the map "(a')" in FIG. 8A and the map "(c')" in FIG. 8B, are present in the database 30a of the storage unit 30. Therefore, the controller 40 obtains a rigid body transformation relation between the two maps of level 2 (i.e., the map "(a')" in FIG. 8A and the map "(c')" in FIG. 8B) using the ICP algorithm and matches the two maps to build a new map of increased level 4 (see "(a")" in FIG. 8C) and then stores the new map in the database 30a of the storage unit 30. Map building for the set space through the hierarchical map building method is completed in this manner. Thus, only one final map "(a")" of FIG. 8C is stored in the database 30a and then the procedure for the moving robot 10 to build a map for the set space is terminated.

FIG. 9 illustrates a procedure in which a method to build a map for a moving robot according to an embodiment is applied when 3D point cloud data of level 1 is acquired a total of seven times while the moving robot travels.

For example, if the hierarchical map building method is applied as described above when 3D point cloud data of level 1 has been acquired a total of 7 times during traveling of the moving robot 10, a total of three maps (i.e., a map of level 4 built through processes of ①→②→③, one map of level 2 built through the process of 0, and one map of level 1) are stored in the database 30a of the storage unit 30 after the moving robot 10 completes traveling for the set space. That is, in the case where two or more maps are present in the database 30a of the storage unit 30 after the moving robot 10 completes traveling for the set space, the controller 40 determines that map building for the set space has not been completed through the hierarchical map building method and thus matches the maps in the order in which the maps have been generated using the ICP algorithm to build a final map for the set space. Specifically, the controller 40 matches the map of level 4, which has been first generated, and the map of level 2 generated next thereto to build a new map and matches the new map and the map of level 1 which has been input last to build a final map for the set space.

Another embodiment suggests a method to build a 3D map for an ambient environment of the moving robot 10 by combining the result of execution of the ICP algorithm during the procedure, in which a plurality of 3D point cloud data are matched according to a hierarchical map building method, with the result of localization (or location) of the moving robot 10.

The Extended Kalman Filter (EKF)-based Simultaneous Localization And Map-building (SLAM) technique provides location estimation information of the moving robot and covariance which is probability information of location errors.

A method to build a map for a moving robot according to another embodiment includes a procedure to combine rigid body transformation information ($x_{icp}$) calculated through the ICP algorithm, deviation information ($P_{cip}$) of the rigid body transformation information ($x_{icp}$), location change information ($x_{slam}$) from the previous location to the current location calculated from the result of localization of the moving robot 10, and covariance information ($P_{slam}$) of the location change information ($x_{slam}$). It may be possible to calculate more correct transformation information (x') by combining two different pieces of information with uncertainty (i.e., the result of execution of the ICP algorithm and the result of localization of the moving robot) through the update process of the EKF using the following Equations 3 to 6.

$$x'=x_{slam}+K[x_{icp}-x_{slam}] \quad \text{[Equation 3]}$$

$$K=P_{slam}H^TS^{-1}, \quad \text{[Equation 4]}$$

where K is a gain of the EKF and $H^T$ is a transposed matrix of H.

$$S = HP_{slam}H^T + P_{icp} \quad \text{[Equation 5]}$$

$$H = \frac{\partial h}{\partial x_{slam}} = -I, \quad \text{[Equation 6]}$$

where $h=x_{icp-xslam}$

The transformation information x' obtained in this manner may be directly applied to the method to build a map using the hierarchy matching scheme according to the embodiment described above and may also minimize the influence of errors that occur during localization and execution of the ICP algorithm, thereby enabling more correct map building.

A method to build a map for a moving robot according to another embodiment is described below with reference to FIG. 10.

When the moving robot 10 starts traveling, the controller 40 determines the location of the moving robot 10 using an EKF based SLAM technique (205). Then, the controller 40 receives 3D distance information from the 3D distance information acquirer 20 (210). Thereafter, the controller 40 constructs a map (3D point cloud data) of level 1 by accumulating 3D distance information input from the 3D distance information acquirer 20 based on the coordinate system of the movement start point of the moving robot 10 while the moving robot 10 travels a preset distance (①), or while the moving robot 10 travels over a preset area in the set space (②), or during a preset time in the case where the moving robot 10 travels at a constant speed (③). The controller 40 then stores the constructed map, together with the result of localization of the moving robot with respect to the movement start point of the moving robot 10, in the database 30a (215). Here, the movement start point indicates the location of the moving robot 10 when the moving robot 10 starts moving over the reference range (such as a preset distance) to construct a map (3D point cloud data) of level 1. 3D point cloud data required to construct a map, the size level of the map, and the result of localization of the current movement start point of the moving robot with respect to the previous movement start point are stored together in the database 30a.

The controller 40 then determines whether or not two maps of the same size level are present in the database 30a of the storage unit 30 (220).

Upon determining that two maps of the same size level are not present in the database 30a of the storage unit 30 ("NO" in operation 220), specifically, upon determining that only one map of the same level size is present in the database 30a, the controller 40 proceeds to operation 245 to determine whether or not the moving robot 10 has completed traveling of the set space (i.e., the space to be mapped).

On the other hand, upon determining that two maps of the same size level are present in the database 30a of the storage unit 30 ("YES" in operation 220), the controller 40 performs the ICP algorithm on the two maps of the same size (225).

The controller 40 then calculates new rigid body transformation information x' by combining the result of localization between movement start points of the moving robot 10 and the result of execution of the ICP algorithm (230).

The controller 40 then matches the two maps having the same size level to build a new map of an increased size level using the calculated new rigid body transformation information x' (235) and stores the new map in the database 30a (240).

The controller 40 then determines whether or not the moving robot 10 has completed traveling of the set space (i.e., the space to be mapped) (245). Here, the user may determine whether or not the moving robot 10 has completed traveling of the set space and provide the determination result to the controller 40 through an input unit (not shown) or the moving robot 10 itself may determine whether or not the moving robot 10 has completed traveling of the set space.

Upon determining that the moving robot 10 has not completed traveling of the set space ("NO" in operation 245), the controller 40 returns to operation 220 to continue to receive 3D distance information of the set space of the moving robot 10, together with the result of localization between movement start points, from the 3D distance information acquirer 20 until two maps of the same level are present in the database 30a and to construct a map of level 1 and then to store the map in the database 30a.

On the other hand, upon determining that the moving robot 10 has completed traveling of the set space ("YES" in operation 245), the controller 40 determines whether or not two or more maps are present in the database 30a of the storage unit 30 (250).

Upon determining that two or more maps are not present in the database 30a ("NO" in operation 250), specifically, upon determining that only one map is present in the database 30a, the controller 40 determines that map building for the set space through the hierarchical map building method has been completed and that only one final map is present in the database 30a and then terminates the map building procedure.

Upon determining that two or more maps are present in the database 30a ("YES" in operation 250), map building for the set space through the hierarchical map building method has not been completed and builds a final map for the set space by sequentially matching the maps in the order, in which the maps are generated, using the ICP algorithm (255). Specifically, the controller 40 sequentially matches maps stored in the database 30a in the order in which the maps are generated through the sequential map building method to build a final map for the set space.

The controller 40 then stores the final map for the set space in the database 30a of the storage unit 30 (260) and then terminates the map building procedure.

As is apparent from the above description, according to a moving robot and a method to build a map for the same according to embodiments, a 3D map for an ambient environment of the moving robot is built using a novel hierarchical matching scheme which matches 3D point cloud data in a hierarchical fashion and therefore it may be possible to rapidly and accurately build a 3D map, compared to the conventional method.

In addition, a 3D map for an ambient environment of the moving robot is built by combining the result of execution of the ICP algorithm during the procedure, in which a plurality of 3D point cloud data are matched according to a hierarchical map building method, with the result of localization of the moving robot and therefore it may be possible to build a 3D map with increased accuracy, compared to the conventional method.

The embodiments can be implemented in computing hardware and/or software, such as (in a non-limiting example) any computer that can store, retrieve, process and/or output data and/or communicate with other computers. For example, computers can be used to perform various computations and/or operations described herein. For example, the controller 40 in FIG. 4 may include a computer to performing calculations and/or operations. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method to build a map for a moving robot, the method comprising: acquiring, by a computer, 3D distance information of an object present in a path along which the moving robot moves; and by at least one computer:
   accumulating, by the computer, the acquired 3D distance information to construct maps, each constituted by three-dimensional (3D) cloud data, of a specific size level and storing the maps in a database; hierarchically matching, by the computer, the maps stored in the database based on the size levels of the maps to build a 3D map for a set space; and controlling, by the computer, the moving robot in accordance with the built 3D map.

2. The method according to claim 1, wherein the accumulating the acquired 3D distance information comprises accumulating the 3D distance information based on a coordinate system of a movement start point of the moving robot while the moving robot travels a preset distance, or while the moving robot travels over a preset area, or during a preset time when the moving robot travels at a constant speed.

3. The method according to claim 1, wherein the hierarchically matching comprises:
   determining whether or not two maps of equal size level are present in the database;
   matching, upon determining that said two maps of said equal size level are present in the database, the two maps using an Iterative Closest Point (ICP) algorithm to build a new map of an increased size level; and
   storing the new map in the database.

4. The method according to claim 3, further comprising:
   determining whether or not said two or more maps are present in the database upon completion of traveling of the moving robot for the set space; and
   matching, upon determining that said two or more maps are present in the database, said two or more maps using the ICP algorithm in an order in which said two or more maps have been generated to build a final map for the set space.

5. A method to build a map for a moving robot, the method comprising: localizing, by a computer the moving robot; acquiring, by the computer, 3D distance information of an object present in a path along which the moving robot moves; and by at least one computer, accumulating, by the computer, the acquired 3D distance information to construct maps, each constituted by three-dimensional (3D) cloud data, of a specific size level and storing the maps, together with a result of the localization of the moving robot, in a database; determining, by the computer, whether or not two maps of equal size level are present in the database; and upon determining that said two maps of said equal level are present in the database, executing, by the computer an Iterative Closest Point (ICP) algorithm on said two maps, calculating new rigid body transformation information by combining a result of the localization of the moving robot and a result of the execution of the ICP algorithm, matching, by the computer, said two maps using the calculated new rigid body transformation information to build a new map of an increased level to build a 3D map for a set space; and controlling, by the computer, the moving robot in accordance with the built 3D map.

6. The method according to claim 5, further comprising storing the new map in the database.

7. The method according to claim 5, wherein localization of the moving robot is performed using Extended Kalman Filter (EKF)-based Simultaneous Localization And Map-building (SLAM).

8. The method according to claim 5, wherein the accumulating the acquired 3D distance information comprises accumulating the 3D distance information based on a coordinate system of a movement start point of the moving robot while the moving robot travels a preset distance, or while the moving robot travels over a preset area, or during a preset time when the moving robot travels at a constant speed.

9. The method according to claim 6, further comprising:
   determining whether or not said two or more maps are present in the database upon completion of traveling of the moving robot for the set space; and
   matching, upon determining that said two or more maps are present in the database, said two or more maps using the ICP algorithm in an order in which said two or more maps have been generated to build a final map for the set space.

10. A moving robot comprising: a 3D distance information acquirer to acquire 3D distance information of an object present in a path along which the moving robot moves; and a controller to accumulate the acquired 3D distance information to construct maps, each constituted by three-dimensional (3D) cloud data, of a specific size level and to store the maps in a database and then to hierarchically match the maps stored in the database based on the size levels of the maps to build a 3D map for a set space, and to control the moving robot in accordance with the built 3D map.

11. The moving robot according to claim 10, wherein the 3D distance information acquirer is a Time of Flight (TOF) camera.

12. The moving robot according to claim 10, wherein the controller accumulates the 3D distance information based on a coordinate system of a movement start point of the moving robot while the moving robot travels a preset distance, or while the moving robot travels over a preset area, or during a preset time when the moving robot travels at a constant speed.

13. The moving robot according to claim 10, wherein the controller
   determines whether or not two maps of equal size level are present in the database,
   matches, upon determining that said two maps of said equal size level are present in the database, the two maps using an Iterative Closest Point (ICP) algorithm to build a new map of an increased level, and
   stores the new map in the database.

14. The moving robot according to claim 13, wherein the controller
   determines whether or not said two or more maps are present in the database upon completion of traveling of the moving robot for the set space, and
   matches, upon determining that said two or more maps are present in the database, the two or more maps using the ICP algorithm in an order in which the two or more maps have been generated to build a final map for the set space.

* * * * *